United States Patent [19]

McBride

[11] 3,940,179
[45] Feb. 24, 1976

[54] FLATBED SIDE PANEL STAKE
[75] Inventor: Thomas McBride, Owensboro, Ky.
[73] Assignee: ECK Miller Transportation Corporation, Owensboro, Ky.
[22] Filed: June 5, 1974
[21] Appl. No.: 476,390

[52] U.S. Cl. .................... 296/43; 296/36; 296/104
[51] Int. Cl.² .............................................. B60P 7/06
[58] Field of Search ............. 296/36, 43, 104, 28 M, 296/10, 12

[56] References Cited
UNITED STATES PATENTS

| | | | |
|---|---|---|---|
| 1,333,396 | 3/1920 | Erret.................................... | 296/43 |
| 1,333,990 | 3/1920 | Mills..................................... | 296/43 |
| 2,565,746 | 8/1951 | Turner.................................. | 296/104 |
| 3,126,224 | 3/1964 | Carter, Jr. et al. ................ | 296/43 X |
| 3,692,354 | 9/1972 | Tuerk ................................... | 296/36 |
| 3,794,375 | 2/1974 | Woodward............................. | 296/36 |

Primary Examiner—Robert J. Spar
Assistant Examiner—Donald W. Underwood
Attorney, Agent, or Firm—Albert J. Santorelli

[57] ABSTRACT

A stake to support vertically positioned side panels on a flatbed trailer comprising a tubular member integral with a plate member, which, together with a T-shaped member, forms grooves to receive and support the side panels. The stake is reversibly received by pockets positioned at the periphery of the flatbed, and stakes are oppositely located along the sides of the flatbed such that their upper ends may receive the ends to tarpaulin bowed rods. The tubular member includes off center stop means to stop and support the ends of the tarpaulin bowed rods. Depending upon which end of the stake is seated in the pocket and the length of the end of the bowed rod used, the height of the transverse portion of the rod from the flatbed may be varied.

3 Claims, 5 Drawing Figures

FLATBED SIDE PANEL STAKE

BACKGROUND OF THE INVENTION

1. Field of the Invention

The invention relates to the field of panel support stakes, and has particular utility for use with flatbed trucks.

2. Description of the Prior Art

There are disclosed in the prior art various stakes to support panels on flatbed trucks. The Tuerk U.S. Pat. No. 3,692,354 discloses stakes having a hollow triangular shaped cross section with tapered bottom ends that fit into pocket brackets mounted to the periphery of the bed. Side panels are mounted to the bed, being supportably received by the stakes with T-shaped brackets integral therewith. Tarpaulin rods are secured to the hollow top ends of the stakes.

Carter, Jr., et al., U.S. Pat. No. 3,126,224 also discloses a stake or post structure for use with a platform trailer bed. The posts include a pair of laterally open vertical grooves extending substantially from end to end of said posts to receive the panels, and a hollow leg which is illustrated as being substantially rectangular in cross section with a curved indentation along the wall of the hollow leg adjacent the grooves. The lower end of the posts is seatable in pockets and a plug is fixed in the upper end which includes a socket for detachably receiving the end of a tarpaulin bow.

Other patents generally relating to a sidewall assembly for a flat load bed including upstanding stakes seatable in pockets include Reader U.S. Pat. No. 3,097,880; Garson et al., U.S. Pat. No. 3,155,419; and Johnson et al., U.S. Pat. No. 3,788,684. The Turner U.S. Pat. No. 2,565,746 and the Owen U.S. Pat. No. 2,774,623 generally relate to supporting frames for truck body covers.

SUMMARY OF THE INVENTION

The present invention relates to stake support structure to support panels on a flatbed truck which provides advantages over the prior art. The stake structure includes an elongated tubular portion with a plate portion being integral and coextensive therewith along one of its faces. A T-shaped elongated member is integrally connected along its leg to the other surface of the plate portion, the opposite faces of the plate member and the T-shaped member defining grooves therebetween on opposite sides of the leg of the T-shaped member. the T-shaped member is not coextensive in length with the tubular and plate members, and opposite ends of the tubular and plate members extend past the corresponding opposite ends of the T-shaped member.

The stakes are securely mounted vertically in pockets along the sides of the flatbed. The bottom end of the T-shaped member is seated on the floor of the flatbed, and the surface of the plate member with which it is integral extends vertically down the side of the flatbed. The described seating arrangement provides increased support for the stake structure.

The grooves defined on opposite sides of the stake receive the side panels. The stakes are mounted around the periphery of the flatbed and are aligned with oppositely positioned stakes, such that the upper ends of the tubular members receive the ends of tarpaulin bowed rods to provide a top cover for the flatbed.

A bow retaining pin is securely mounted within the tubular member off center relative to the longitudinal dimension of the stake. The stake structure including the tubular plate and the T-shaped member is symmetrical in configuration, and the off center positioning of the bow retaining pin provides an adjustment in the height of the configuration. Thus, depending upon which end of the stake is received by the flatbed, the use of tarpaulin bowed rods of different length ends provides adjustability in overall height of the transverse portion of the tarpaulin bowed rod from the flatbed.

DETAILED DESCRIPTION OF THE DISCLOSURE

Figure 1:
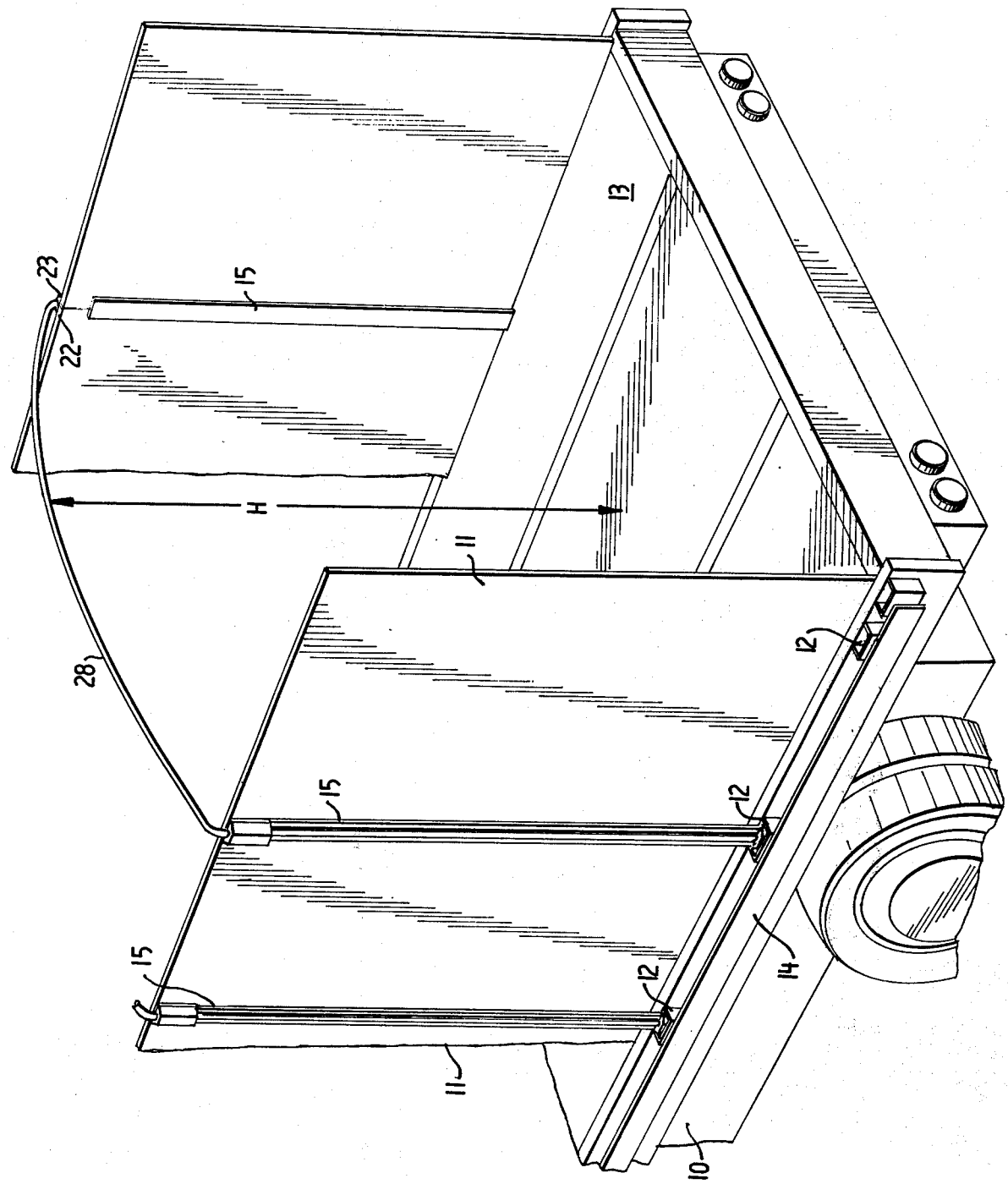
FIG. 1 is an isometric view of a flatbed truck using the stake structure of the invention.

FIG. 1 shows a trailer body 10 which, through the use of panels 11, may be converted to an enclosed condition suitable for highway use. The shown trailer body is conventional in the art and includes a plurality of pockets 12 permanently mounted to the sides of flatbed 13, around the periphery thereof. A side railing 14 mounted to the outside of pockets 12 is also exemplarily used in the art. A plurality of stake structures 15 are vertically mounted in the pockets to support panels 11 as described in detail hereinafter.

Figure 2:
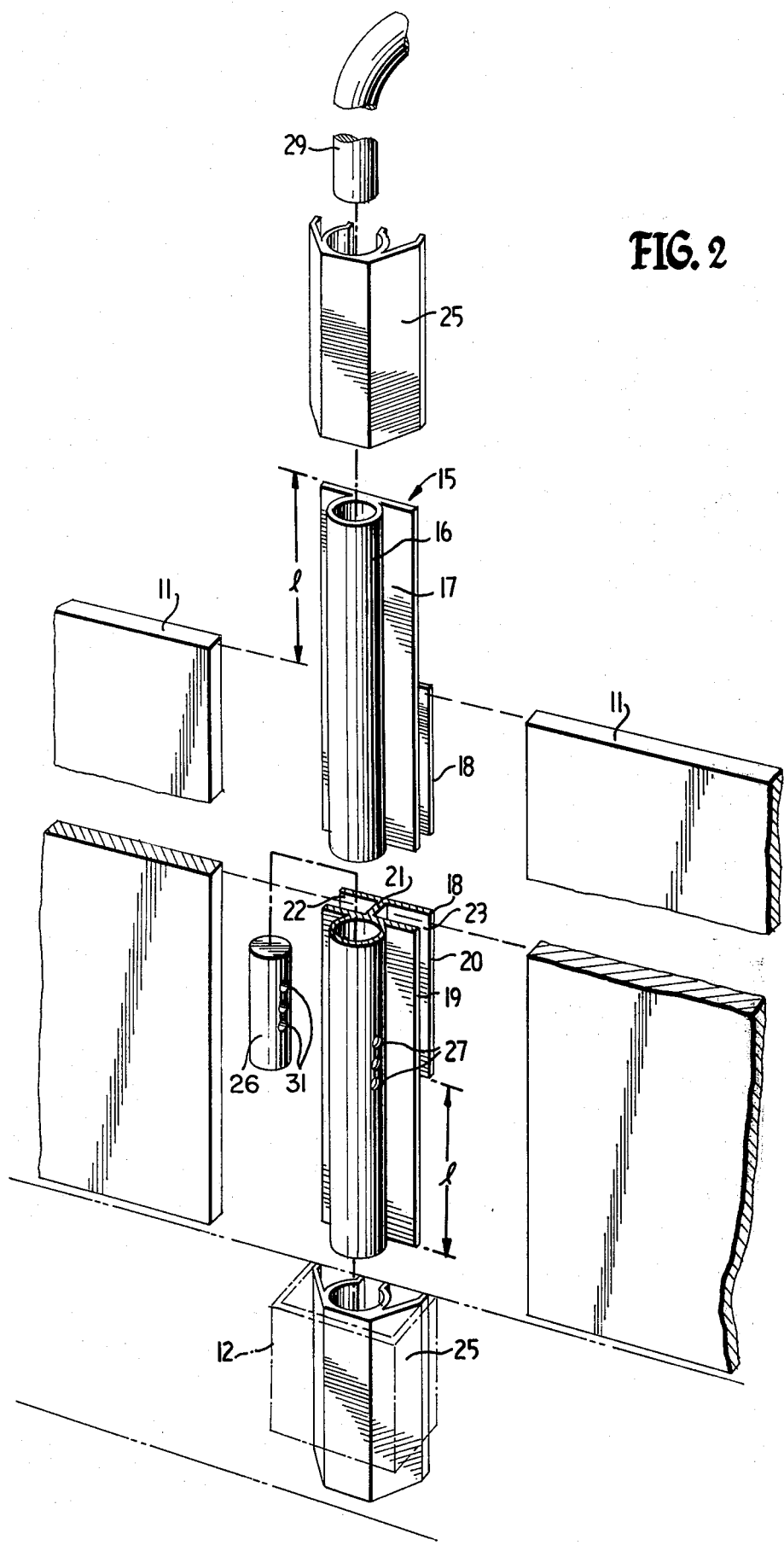
FIG. 2 is an exploded detail isometric view of the stake structure according to the invention.

FIGS. 2 through 5 show the stake structure 15 in greater detail. The stake structure comprises an elongated tubular member 16 integral with elongated plate member 17, and coextensive with the longitudinal dimension thereof. A T-shaped member 18 is integral with plate member 17. Opposite faces 19 and 20 of plate member 17 and T-shaped member 18 respectively are connected by leg 21 of T-shaped member 18. The longitudinal dimension of T-shaped member 18 is less than that of tubular member 16 and plate member 17, with the ends of the latter extending beyond the ends of T-shaped member 18 by a distance $l$. The width of plate member 17 is shown as the same as the width of T-shaped member 18, although this is not essential, and the opposite faces 19 and 20 thereof form grooves 22 and 23 on opposite sides of leg 21. The panels 11 are vertically received and supported by those grooves as shown in FIGS. 1 and 2.

Figure 4:
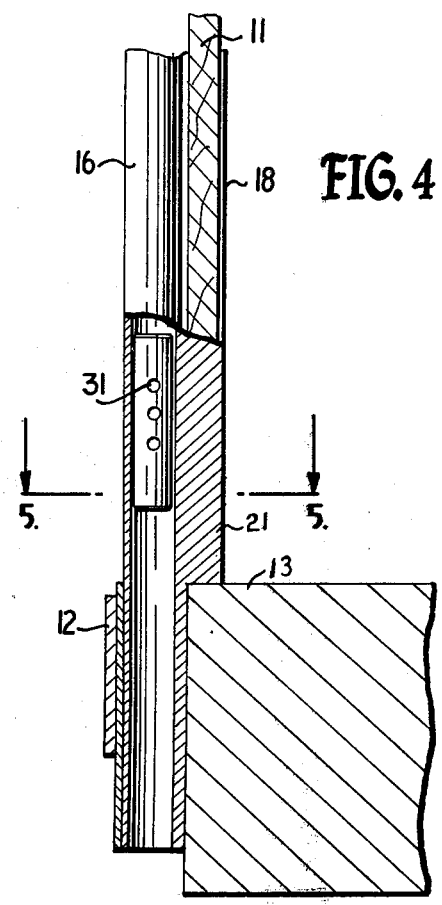
FIG. 4 is a partial sectional view of the stake structure, taken along section lines 4—4 of FIG. 3.
Figure 5:
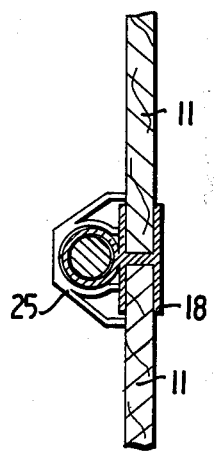
FIG. 5 is a sectional view of the stake structure, taken along section line 5—5 of FIG. 4.

FIG. 4 shows in greater detail the manner in which each stake 15 is vertically seated in its corresponding pocket 12. The bottom end of leg 21 rests on the floor of flatbed 13. The surface 19 of plate member 17 abuts for length $l$ beyond the bottom end of leg 21 against the side of flatbed 13. An adaptor 25 is fitted over each end of stake 15, firmly around the tubular structure member 16. The stake and adaptor structure thus far described is symmetrically configured.

Figure 3:
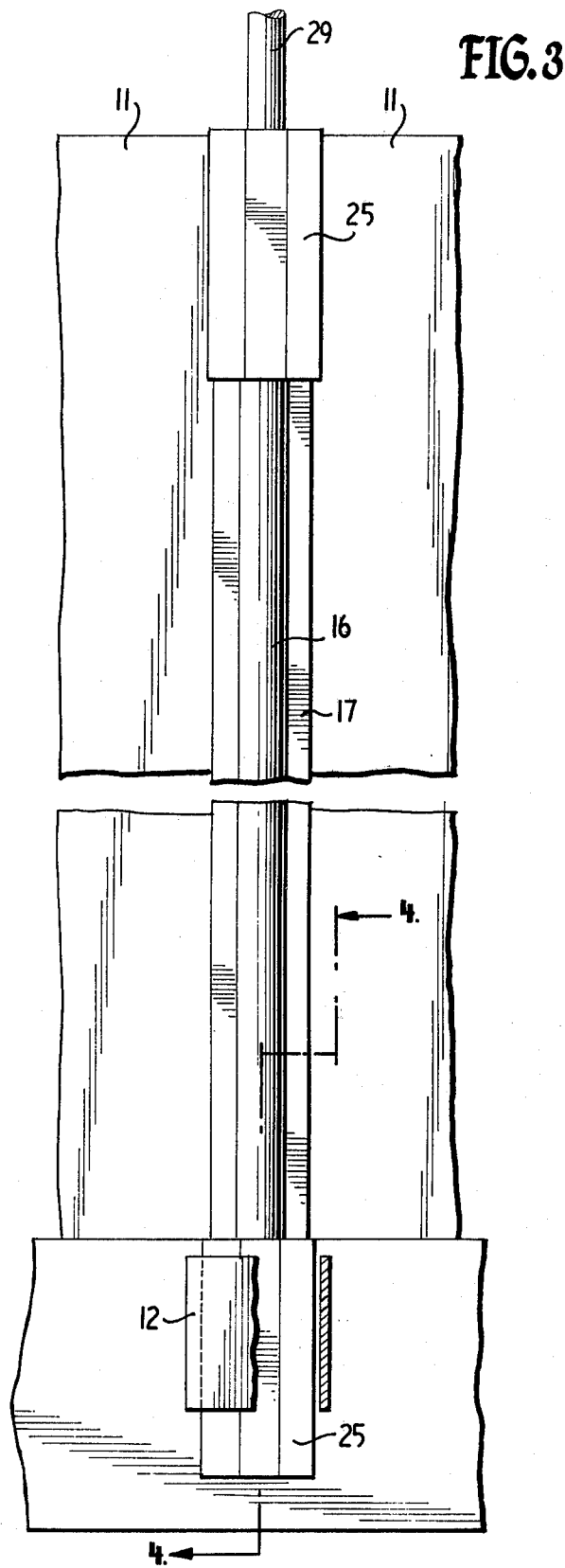
FIG. 3 is a frontal view of the stake structure of the invention.

A bow end retaining and support cylinder 26 is securely positioned within tubular member 16 as shown in FIGS. 2 through 4. A plurality of apertures 27 are defined on opposite sides of tubular member 16 for receiving spot welding pins (not shown) interfitting with holes 31 of cylinder 26 for welding cylinder 26 securely at the desired location within tubular member 16. However, other securing means may be substituted.

As shown in the drawings, the cylinder 26 is positioned off center from the middle of the stake, and is thus closer to one end of the tubular member 16 compared to the other end. The tarpaulin bow 28 comprises bow ends 29 which are received by the top ends of tubular members 16. The cylinder 26 functions as a stop and support means for bow ends 29. The height H between the flatbed 13 and the transverse position of tarpaulin bow 28 is thus adjustable by reversing the position of the stake in its pocket and, further, by using tarpaulin bows having bow ends of different lengths.

As shown in the figures, the stakes 15 have an adaptor 25 fitted over each end thereof. The stakes are vertically supported by the adaptors in pockets 12, with sets of stakes 15 being located directly opposite one another on opposite sides of the flatbed. The panels 11 are supported in grooves 22 and 23, and the ends 29 of tarpaulin support bow 28 are received by the free ends of tubular structure 16 and extend therein depending upon their length and the position of cylinder 26 within tubular member 16. The stakes including the adaptors are removable from their respective pockets for reversible mounting therein, to thus change the height H between flatbed 13 and the transverse portion of tarpaulin support bow 28; the height H being further variable through the use of bows having bow ends of different lengths.

The stakes may be made of aluminum to decrease the weight thereof and are particularly strong, although the amount of material used is minimized relative to the prior art. The adjustable height feature of the invention resulting from the reversible nature of the stakes is particularly useful and enables drivers of different heights to easily adjust the distance between the flatbed and the bow to accommodate themselves. The height adjustment feature also enables the use of side panels of different heights to be employed if desired.

I claim:

1. A stake configuration for use with a trailer flatbed to support side panels comprising:

a tubular member, a plate member tangentially integral and coextensive along one of its faces with the tubular member along the longitudinal dimension, a T-shaped member, the leg thereof being integral with the plate member along the other face of the latter to form grooves to receive the side panels, the longitudinal dimension of the T-shaped member being less than the longitudinal dimension of the tubular and plate members, opposite ends of the T-shaped member in the longitudinal dimension being spaced at equal distances from opposite ends of the coextensive tubular and plate members in the longitudinal dimension located nearest thereto, such that either end of the stake configuration may be received by the flatbed, means mounted within the tubular member and positioned closer to one end of the tubular member relative to the other end to vary the height at which the transverse portion of tarpaulin bowed rods are received within the tubular member and stopped and supported from the flatbed, depending on which end of the stake configuration is received by the flatbed.

2. In combination with a trailer flatbed having pocket brackets mounted around the periphery of the flatbed, stakes mounted in the pocket brackets to receive and vertically support side panels, the improvement comprising:

each of said stakes having a tubular member, a plate member tangentially integral and coextensive along one of its faces with the tubular member along the longitudinal dimension, and a T-shaped member, the leg thereof being integral with the plate member along the other face of the latter to form grooves to receive the side panels, the longitudinal dimension of the T-shaped member being less than the longitudinal dimension of the tubular and plate members, opposite ends of the T-shaped member in the longitudinal dimension being spaced at equal distances from opposite ends of the coextensive tubular and plate members in the longitudinal dimension nearest thereto, such that either end of the stake configuration may be vertically received by the pocket brackets, and means mounted within the tubular member and positioned closer to one end of the tubular member relative to the other end to vary the height at which the transverse portion of tarpaulin bowed rods are received within the tubular member and stopped and supported from the flatbed, depending on which end of the stake configuration is received by the pocket brackets.

3. The combination of claim 2 further comprising adaptor means mounted at each end of the tubular member to mount and support the stake in the pocket bracket.

* * * * *